United States Patent [19]

Babico et al.

[11] Patent Number: 4,977,477
[45] Date of Patent: Dec. 11, 1990

[54] SHORT-CIRCUIT PROTECTED SWITCHED OUTPUT CIRCUIT

[75] Inventors: John Y. Babico, Wheeling; Adelore F. Petrie, Arlington Heights, both of Ill.

[73] Assignee: Motorola, Inc., Schaumburg, Ill.

[21] Appl. No.: 389,133

[22] Filed: Aug. 3, 1989

[51] Int. Cl.[5] .............................................. H02H 3/08
[52] U.S. Cl. ..................................... 361/98; 361/101; 361/57
[58] Field of Search ...................... 361/87, 93, 98, 101, 361/56, 57; 320/207 D, 298

[56] References Cited

U.S. PATENT DOCUMENTS

| | | | |
|---|---|---|---|
| 4,750,079 | 6/1988 | Foy et al. | 361/98 X |
| 4,849,850 | 7/1989 | Brahms | 361/101 |

Primary Examiner—Derek S. Jennings

[57] ABSTRACT

A short-circuit protected switched output circuit having: an input node (I10) for receiving an input switching signal; an output node (O10) for outputting a switched output signal; switch means (Q10) connected between the input and output nodes; and a Schmitt trigger NAND gate oscillator arrangement (C10, D11, D12, NG10, R12, R13, R14) having an input coupled to the output node and having an output coupled via diode means to the input node, whereby the oscillator arrangement produces a low frequency, low duty-cycle, fixed-frequency signal at the output node in the event of the output node being short-circuited. An alternative circuit using a Schmitt trigger inverter is also disclosed.

12 Claims, 1 Drawing Sheet

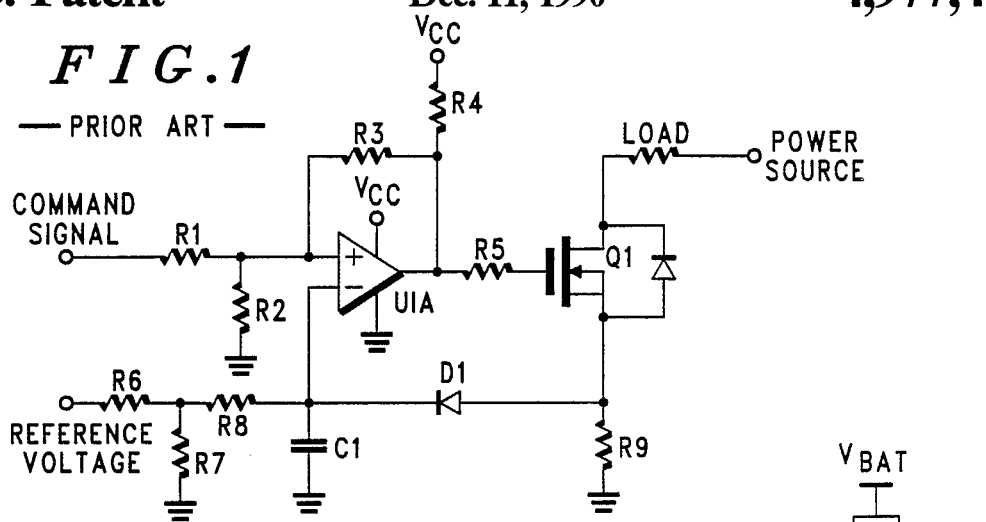
FIG.1 — PRIOR ART —
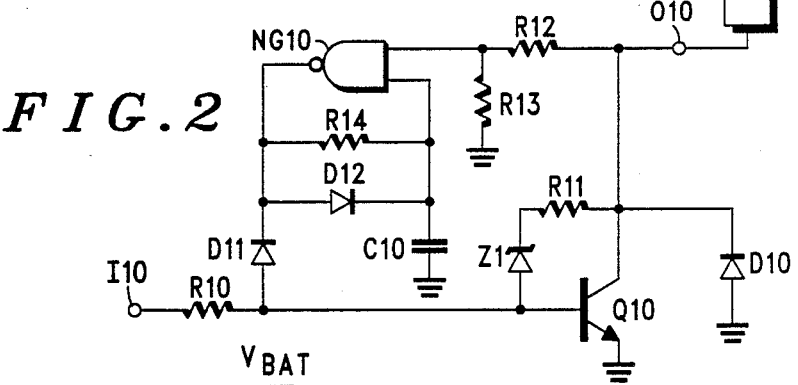
FIG.2
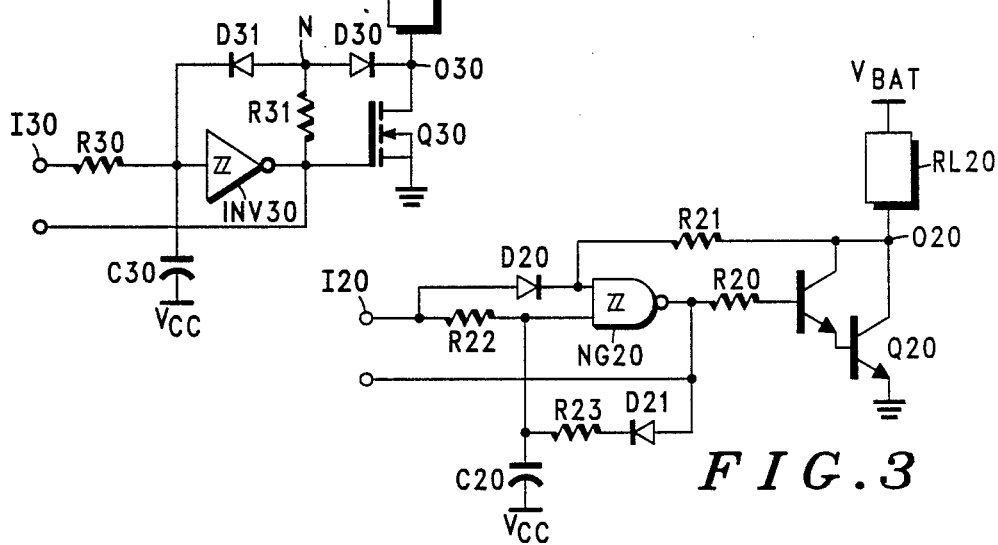
FIG.4
FIG.3

SHORT-CIRCUIT PROTECTED SWITCHED OUTPUT CIRCUIT

BACKGROUND OF THE INVENTION

This invention relates to short-circuit protected switched output circuits. Such arrangements are used in automotive applications, for example to switch driving currents to inductive loads such as relays.

In a typical such short-circuit protected switched output circuit it is known to use a comparator coupled to the circuit's output node and to a reference voltage. The comparator is arranged to function as an oscillator producing an output signal having a low frequency, low duty-cycle signal at the output node in the event of the output node being short-circuited. Such a known short-circuit protected switched output circuit is shown in FIG. 1 of the accompanying drawings.

As will be seen in FIG. 1, an output switching transistor Q1 has its current electrodes coupled respectively to a load and to a ground connected resistor R9, and has its control electrode connected to the output of a differential voltage comparator U1A. The negative input (−) of the comparator is coupled to the ground-coupled electrode of transistor Q1 via a diode D1 and to a reference voltage node via a potential divider network. The positive input (+) of the comparator is coupled to a command signal node and to a supply voltage (VCC) node via a feedback path from the comparator output.

Such a known short-circuit protected switched output circuit is subject to a number of disadvantages: the circuit is subject to power dissipation in the resistor R9 coupling the switching transistor Q1 to ground and in the protection circuitry through which the switch is driven.

SUMMARY OF THE INVENTION

It is an object of the present invention to provide an improved short-circuit protected switched output circuit wherein the above disadvantages may be overcome or at least alleviated.

In accordance with a first aspect of the present invention there is provided a short-circuit protected switched output circuit having:
an input node for receiving an input switching signal;
an output node for outputting a switched output signal;
switch means coupled between the input and output nodes and having a control electrode; and
oscillator means for producing a low frequency, low duty-cycle signal at the output node in the event of the output node being short-circuited, the oscillator means comprising:
a threshold sensitive NAND gate having first and second inputs and an output, the first NAND gate input being coupled to the output node, and the NAND gate output being coupled to the control electrode of the switch means;
capacitance means coupled between the second NAND gate input and a reference potential; and
diode means coupled between the second NAND gate input and the NAND gate output.

In accordance with a second aspect of the present invention the oscillator means alternatively comprises:
a threshold sensitive inverter having an input and an output, the inverter input being coupled to the inverter output, and the inverter output being coupled to the control electrode of the switch means;
capacitance means coupled between the inverter input and a reference potential; and diode means coupled between the inverter input and the output node.

BRIEF DESCRIPTION OF THE DRAWINGS

Three short-circuit protected switched output circuits in accordance with the present invention for driving relays will now be described with reference to the accompanying drawings, in which:
FIG. 1 shows a circuit diagram of a prior art short-circuit protected switched output circuit;
FIG. 2 shows a circuit diagram of a first short-circuit protected switched output circuit in accordance with the invention;
FIG. 3 a circuit diagram of a second short-circuit protected switched output circuit in accordance with the invention; and
FIG. 4 shows a circuit diagram of a third short-circuit protected switched output circuit in accordance with the invention.

DESCRIPTION OF THE PREFERRED EMBODIMENT

Referring now to FIG. 1, a known prior art short-circuit protected switched output circuit includes a switching n-channel power field-effect transistor Q1 which has its current electrodes coupled respectively to a load and to a ground connected resistor R9, and has its control electrode connected to the output of a differential voltage comparator U1A. The negative input (−) of the comparator is coupled to the ground-coupled electrode of transistor Q1 via a diode D1, to ground via a capacitor C1, and to a reference voltage node via a potential divider network R6, R7, R8. The positive input (+) of the comparator is coupled to a command signal node via a potential divider R1, R2 and to a supply voltage (VCC) node via a resistor R4 through a feedback path from the comparator output which includes a resistor R3.

The voltage applied to the reference voltage node is regulated to a particular D.C. voltage in order to generate a desired load current The voltage applied at the reference voltage node is divided by resistors R6, R7, and this divided voltage level is applied to the negative input of the comparator U1A through resistor R8. At this point diode D1 is reverse biased, isolating the negative input of the comparator from resistor R9. With a normal minimum load on the drain of transistor Q1 current will be limited to a maximum value given by $V_{APPLIED}/(R_L + R_{Q1} + R_9)$, where $V_{APPLIED}$ is the applied reference voltage, $R_L$ is the load resistance, $R_{Q1}$ is the resistance of transistor Q1 and $R_9$ is the resistance of resistor R9. Thus when total load current is determined, a maximum value of voltage will be generated across R9 which should be no greater than the sum of the voltage at the negative input of the comparator and the forward voltage drop of diode D1.

The values of resistors R1, R2 are chosen so that when the circuit is commanded "on" by a desired voltage applied to the command signal input, the voltage at the positive input of the comparator will be slightly greater than that at the negative input, causing the comparator output to switch to a high impedance state. This causes current to stop flowing through R4, bringing the output voltage of the comparator to VCC and energizing transistor Q1 through resistor R5. The combination of R5 and the gate capacitance of transistor Q1 determine the rise time of the voltage at the gate of transistor Q1. Resistor R5 may be omitted in non-critical applications.

When transistor Q1 is turned "on" and the load is shorted to $V_{APPLIED}$, excess current flows through transistor Q1 and resistor R9, generating a voltage across resistor R9. This voltage across resistor R9 will overwhelm the forward drop of diode D1 and will be dumped on capacitor C1 which will already be charged to the voltage at the negative input of the comparator. At this point the voltage at the negative input of the comparator will exceed the scaled maximum voltage at the positive input, causing the comparator's output to switch to ground, turning "off" transistor Q1. Transistor Q1 will remain "off" until capacitor C1 discharges sufficiently through R7, R8 to permit the comparator's positive input to become dominant, thus repeating the cycle. In this way the duty cycle of transistor Q1 can be reduced to significantly less than 1% "on" time, greatly reducing power dissipation in the transistor Q1 and enhancing longevity of the transistor under short-circuit conditions.

However, the known prior art circuit of FIG. 1 is subject to power dissipation in the resistor R9 coupling the transistor Q1 to ground and in the protection circuitry through which the the transistor is driven. Also, the oscillator frequency of the known prior art circuit of FIG. 1 varies according to the current flowing through the transistor Q1.

Referring now to FIG. 2, a first short-circuit protected switched output circuit in accordance with a preferred embodiment of the present invention includes a npn Darlington power transistor Q10 (e.g. type MPSA29 sold by Motorola, Inc.) for switching the output drive to a load (such as a relay RL10) connected to an output terminal O10 in response to a control voltage applied at node I10. The relay RL10 is connected in use to an automotive battery voltage $V_{BAT}$. The emitter of the transistor Q10 is connected to ground. The base of the transistor Q10 is connected via a resistor R10 (10K $\Omega$) to the input node I10. The collector of the transistor Q10 is connected to the output terminal O10 and to its own base via a series-connected resistor R11 (10K $\Omega$) and Zener diode Z1 which protects the transistor Q10 from flyback transients of relay RL10. The transistor Q10 is protected from reverse battery connection by a diode D10 connected between the collector of the transistor and ground.

The output terminal O10 is connected via a resistor R12 (120K $\Omega$) to the upper input of a two-input Schmitt trigger NAND gate NG10 (e.g. type MC14093B sold by Motorola, Inc.), which NAND gate input is also connected via a resistor R13 (360K $\Omega$) to ground. The output of the NAND gate NG10 is connected via a diode D11 to the base of the transistor Q10. The output of the NAND gate NG10 is also connected via parallel-connected resistor R14 (100K $\Omega$) and diode D12 to the lower input of the NAND gate NG10, which NAND gate input is also connected via a capacitor C10 (0.047 $\mu$F) to ground.

In use of the circuit of FIG. 2, in the absence of a short-circuit the circuit operates as follows. When a high voltage is applied at the input node I10, the transistor Q10 conducts, pulling its collector low and so applying a low voltage to the upper input of the NAND gate NG10. In response to a low voltage at one of its inputs, the NAND gate NG10 produces a high voltage at its output, which charges the capacitor C10 and reverse biases the diode D11. With the diode D11 reverse biased, the oscillator arrangement (C10, D11, D12, NG10, R12, R13 and R14) is effectively taken out of circuit, and the transistor Q10 is controlled by the voltage applied at the input node I10.

If the output terminal O10 is short-circuited to the automotive battery voltage $V_{BAT}$, a high voltage is applied to the upper input of the NAND gate NG10, which (since the lower input is at a high voltage from the charge on the capacitor C10) causes the output of the NAND gate to go low. When the NAND gate output goes low, the capacitor C10 begins discharging through resistor R14 and at the same time the diode D11 is forward biased, causing the voltage at the base of the transistor Q10 to be pulled low and turning "off" the transistor Q10. When the capacitor C10 is discharged to the threshold of the lower input of the NAND gate NG10, the output of the NAND gate goes high, reverse biasing the diode D11 and causing the transistor Q10 to be turned on. The transistor remains "on" for a time until diode D12 charges the capacitor C10 to a voltage greater than the threshold of the lower input of the NAND gate, at which point the NAND gate output goes low, causing the capacitor C10 to discharge, reverse biasing the diode D11 and turning "off" the transistor Q10 as described above. The "on" time of the transistor Q10 in the event of a short-circuit of the output node to $V_{BAT}$ is determined by the level of the source current supplied at the output of the NAND gate NG10 and by the value of the capacitor C10. The "off" time of the transistor Q10 is determined by the values of the resistor R14 and the capacitor C10. It will be appreciated that the oscillator circuit oscillates at a fixed frequency, independent of the current carried by the transistor Q10, and with a fixed duty-cycle. In the present example the values were chosen so as to produce a duty cycle of approximately 1%.

It will be understood that when the short-circuit is removed, the transistor Q10, when next activated, remains "on" without the circuit latching.

It will be appreciated that the circuit of FIG. 2 described above operates without the need for a current sensing resistor connected to the switching transistor, and so obviates the current dissipation disadvantage associated therewith. It will also be appreciated that in the operation of the circuit of FIG. 2 described above in the absence of a short circuit condition the oscillator arrangement is effectively taken out of circuit and so consumes substantially no power.

Referring now to FIG. 3, a second short-circuit protected switched output circuit in accordance with the present invention includes a npn Darlington power transistor Q20 (e.g. type MPSA29 sold by Motorola, Inc.) for switching the output drive to a load RL20 connected to an output node O20 in response to a control voltage applied at input node I20. The load RL20 is connected in use to an automotive battery voltage $V_{BAT}$. The emitter of the transistor Q20 is connected to ground. The base of the transistor Q20 is connected via a resistor R20 (3.3K $\Omega$) to the output terminal of a two-input Schmitt trigger NAND gate NG20 (e.g. type MC14093B sold by Motorola, Inc.). The collector of the transistor Q20 is connected to the output node O20.

The output node O20 is connected via a resistor R21 (100K $\Omega$) to the upper input of the Schmitt trigger NAND gate NG20 which input is also connected via a diode D20 to the input node I20. The lower input of the NAND gate NG20 is connected via a resistor R22 to the input node I20 and via a capacitor C20 (0.01 μF) to a reference potential VCC. The output of the NAND gate NG20 is also connected via series-connected resistor R23 (3.3K Ω) and diode D21 to the lower input of the NAND gate NG20.

In use of the circuit of FIG. 3 an opposite polarity input signal is applied at the input node I20 in comparison with the signal polarity of the circuit of FIG. 2, i.e. in the circuit of FIG. 3 a high positive input (e.g. 5V) voltage indicates "off", while a low (e.g. zero) voltage represents "on". In the absence of a short-circuit the circuit of FIG. 3 operates as follows. When a low voltage is applied at the input node I20, the output of NAND gate NG20 goes high after a delay caused by resistor R22 and capacitor C20. The high voltage at the output of the NAND gate NG20 turns "on" the transistor Q20, pulling the output node O20 to ground. The low voltage at the putput node O20 pulls the upper input of the NAND gate NG20 low through resistor R21, holding the output of the NAND gate NG20 high, and holding output node O20 near to ground through transistor Q20.

If the output node O20 is shorted to the automotive battery voltage V$_{BAT}$, output node O20 never goes low, keeping the upper input of NAND gate NG20 high and allowing the lower input to control the NAND gate NG20 high. The high voltage at the output of NAND gate NG20 is transmitted through diode D21 and resistor R23 to capacitor C20, pulling the lower input of NAND gate NG20 also high, causing the NAND gate output to go low again and turn "off" transistor Q20. Capacitor C20 then discharges again through resistor R22, repeating the cycle of a short "on" time followed by a long "off" time for transistor Q20.

When input node I20 is held high ("off"), the lower input of NAND gate NG20 is held high through resistor R22 while the upper input of the NAND gate is held high through diode D20, ensuring that the NAND gate output is low and that transistor Q20 is off.

It will be appreciated that the output of the NAND gate NG20 can serve as a sense output indicating a short circuit of the output node O20 to V$_{BAT}$: the voltage at the NAND gate output has a constant high value when the circuit is operating normally without a short circuit, but has a value pulsing between low and high when a short-circuit occurs and the oscillator circuit is forced into oscillation. It will also be appreciated that by connecting the capacitor C20 to the reference potential VCC, at power-up of the circuit the NAND gate output is assured to remain low, obviating a glitch which would occur (momentarily energizing the relay RL20 until both NAND gate inputs stabilized) if the capacitor were instead connected to ground.

It will be appreciated that although operating from a different polarity input signal compared with the circuit of FIG. 2, the circuit of FIG. 3 offers the same advantages of producing a fixed-frequency, fixed duty-cycle oscillation and not requiring a current sensing resistor.

Referring now to FIG. 4, a third short-circuit protected switched output circuit in accordance with the present invention includes a power field-effect transistor (FET) Q30 for switching the output drive to a load RL30 connected to an output node O30 in response to a control voltage applied at input node I30. The load RL30 is connected in use to an automotive battery voltage V$_{BAT}$. The transistor Q30 has its source and drain electrodes connected between ground and the output node O30. The gate electrode of the transistor Q30 is connected to the output terminal of a Schmitt trigger inverter INV30 (e.g. type MC14584B sold by Motorola, Inc.).

The output node O30 is connected, via reverse-polarity series-connected diodes D30, D31 having a common point at node N, to the input of the inverter INV30. The input of the inverter INV30 is also connected via a resistor R30 (330K Ω) to the input node I30 and via a capacitor C30 (0.01 μF) to a reference potential VCC. The output of the inverter INV30 is also connected via a resistor R31 (10K Ω) to the node N.

In use of the circuit of FIG. 4, as in the circuit of FIG. 3, an opposite polarity input signal is applied at the input node I30 in comparison with the signal polarity of the circuit of FIG. 2. In the absence of a short-circuit the circuit of FIG. 4 operates as follows. When a low voltage is applied at the input node I30, the output of inverter INV30 goes high after a delay caused by resistor R30 and capacitor C30. The high voltage at the output of the inverter INV turns "on" the transistor Q30, pulling the output node O30 to ground. The low voltage at the output node O30 pulls the node N low through diode D30, preventing the input of the inverter INV30 from being pulled high by the high voltage at the output of the inverter INV30. This keeps the output of the inverter high and maintains the output node O30 near to ground through transistor Q30.

If the output node O30 is shorted to the automotive battery voltage V$_{BAT}$, output node O30 never goes low. In this event the high voltage at output node O30 reverse biases the diode D30, preventing it from clamping the oscillator output as before. The high voltage at the output of inverter INV30 is transmitted through diode D31 to capacitor C30, pulling the input of inverter INV also high, causing the inverter output to quickly go low again and turn "off" transistor Q30. Capacitor C30 then discharges again through resistor R30, repeating the cycle of a short "on" time followed by a long "off" time for transistor Q30.

When input node I30 is held high ("off"), the input of inverter INV30 is held high through resistor R30, ensuring that the inverter output is low and that transistor Q30 is "off".

It will be appreciated that, like the circuit of FIG. 3, the circuit of FIG. 4 offers the same advantages of producing a fixed-frequency, fixed duty-cycle oscillation and not requiring a current sensing resistor.

It will be appreciated that various modifications or alternatives to the above described embodiments will be apparent to the man skilled in the art without departing from the inventive concept of providing a short-circuit protected switched output circuit in which an oscillator uses a threshold sensitive logic device connected in a simple manner so as to produce a low frequency, low duty cycle output without requiring a voltage sensing resistor.

We claim:

1. A short-circuit protected switched output circuit having:
   an input node for receiving an input switching signal; an output node for outputting a switched output signal; switch means coupled between the input and output nodes and having a control electrode; and
   oscillator means for producing a low frequency, low duty-cycle signal at the output node in the event of the output node being short-circuited, the oscillator means comprising:
  a threshold sensitive NAND gate having first and second inputs and an output, the first NAND gate input being coupled to the output node, and the NAND gate output being coupled to the control electrode of the switch means;
  capacitance means coupled between the second NAND gate input and a reference potential; and
  diode means coupled between the second NAND gate input and the NAND gate output.

2. A circuit according to claim 1 wherein the NAND gate comprises a Schmitt trigger device.

3. A circuit according to claim 1 wherein the output node is coupled to the first NAND gate input via a resistance.

4. A circuit according to claim 1 wherein the oscillator means further comprises a resistance coupled between the NAND gate output and the NAND gate second input.

5. A circuit according to claim 1 wherein the switch means comprises a Darlington transistor.

6. A circuit according to claim 1 wherein the switch means comprises a field effect transistor.

7. A short-circuit protected switched output circuit having:
  an input node for receiving an input switching signal;
  an output node for outputting a switched output signal;
  switch means connected between the input and output nodes; and
  oscillator means for producing a low frequency, low duty-cycle signal at the output node in the event of the output node being short-circuited, the oscillator means comprising:
    a Schmitt trigger NAND gate having first and second inputs and an output, the first NAND gate input being coupled to the output node,
    capacitance means coupled between the second NAND gate input and a reference potential,
    a first diode coupled between the NAND gate output and the input node, and
    a second diode coupled between the NAND gate output and the second NAND gate input.

8. A short-circuit protected switched output circuit having:
  an input node for receiving an input switching signal;
  an output node for outputting a switched output signal;
  switch means connected between the input and output nodes; and
  oscillator means for producing a low frequency, low duty-cycle signal at the output node in the event of the output node being short-circuited, the oscillator means comprising:
    a Schmitt trigger NAND gate having first and second inputs and an output, the first NAND gate input being coupled to the output node,
    capacitance means coupled between the second NAND gate input and a reference potential,
    a first diode coupled between the NAND gate output and the second NAND gate input, and
    a second diode coupled between the second NAND gate input and the first NAND gate input.

9. A short-circuit protected switched output circuit having:
  an input node for receiving an input switching signal;
  an output node for outputting a switched output signal;
  switch means coupled between the input and output nodes and having a control electrode; and
  oscillator means for producing a low frequency, low duty-cycle signal at the output node in the event of the output node being short-circuited, the oscillator means comprising:
    a threshold sensitive inverter having an input and an output, the inverter input being coupled to the inverter output, and the inverter output being coupled to the control electrode of the switch means;
    capacitance means coupled between the inverter input and a reference potential; and
    diode means coupled between the inverter input and the output node.

10. A circuit according to claim 9 wherein the inverter comprises a Schmitt trigger device.

11. A circuit according to claim 9 wherein the inverter output is coupled to the inverter input via a resistance.

12. A circuit according to claim 9 wherein the inverter output is coupled to the inverter input via further diode means.

* * * * *